April 20, 1937. S. G. DOWN 2,077,918
FLUID PRESSURE BRAKE
Filed Feb. 6, 1936
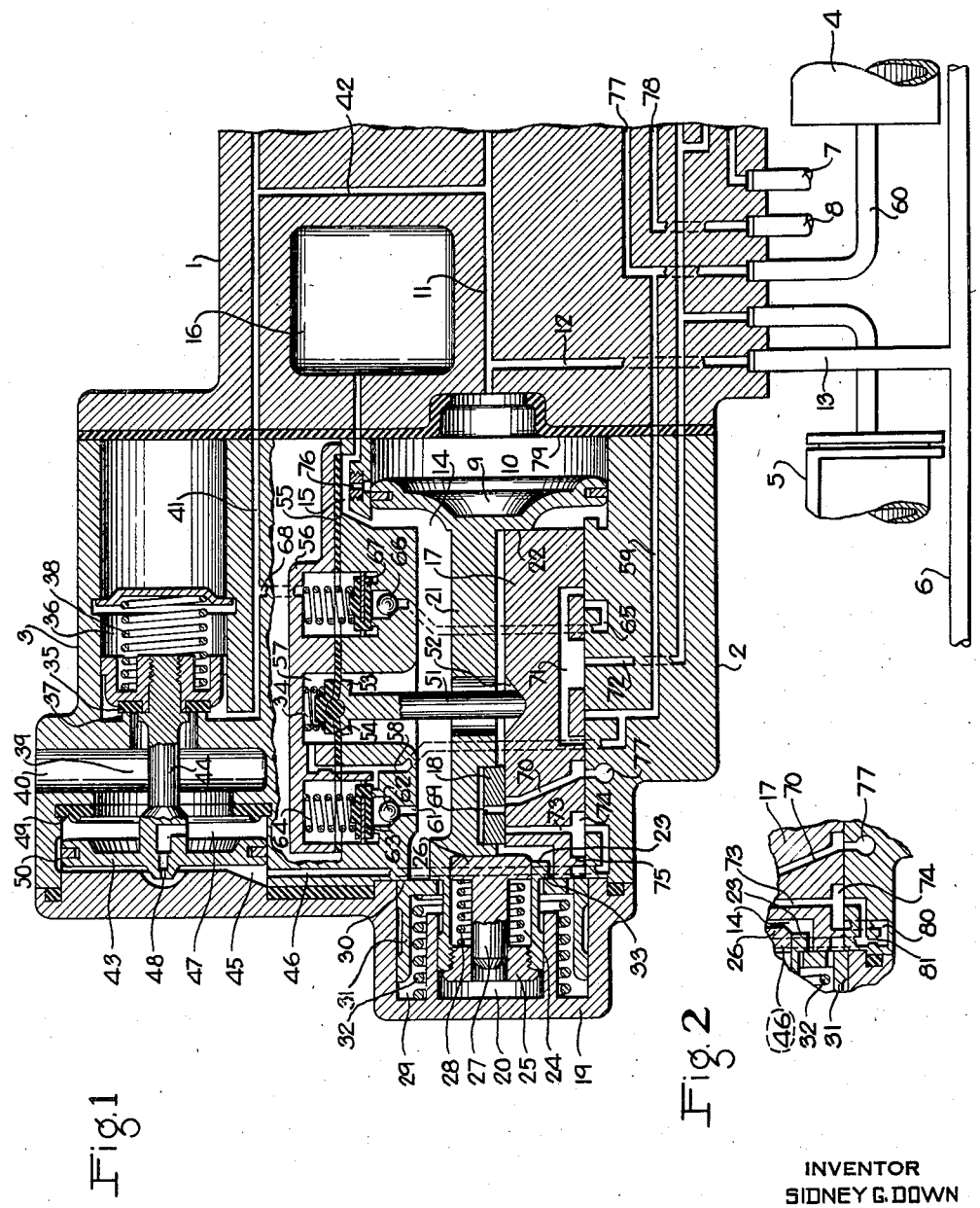
INVENTOR
SIDNEY G. DOWN
BY Wm. M. Cady
ATTORNEY Patented Apr. 20, 1937

2,077,918

UNITED STATES PATENT OFFICE 2,077,918

FLUID PRESSURE BRAKE

Sidney G. Down, Edgewood, Pa., assignor to The Westinghouse Air Brake Company, Wilmerding, Pa., a corporation of Pennsylvania Application February 6, 1936, Serial No. 62,623

17 Claims. (Cl. 303—42)

This invention relates to fluid pressure brake equipment and more particularly to the type adapted to operate upon a reduction in brake pipe pressure to effect an application of the brakes.

In Patent No. 2,031,213 issued to Clyde C. Farmer, on February 18, 1936, a brake controlling valve device is disclosed which comprises a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

The emergency portion comprises a piston subject to the opposing pressures of the brake pipe and a quick action chamber, a main slide valve, and an auxiliary slide valve mounted on the main slide valve, these slide valves being controlled by the piston.

Upon a service reduction in brake pipe pressure, the emergency piston is adapted to move the auxiliary slide valve relative to the main slide valve to a service position in which a communication is established between the quick action chamber and the atmosphere. Through this communication the pressure of fluid in the quick action chamber is adapted to be reduced at such a rate relative to a service rate of reduction in brake pipe pressure as to prevent the build up of a sufficient differential of pressures on said piston to cause the continued movement thereof. This communication is so restricted, however, that when the brake pipe pressure is reduced at an emergency rate, a differential of pressures will be obtained on the emergency piston to move said piston and thereby the auxiliary slide valve relative to the main slide valve through the service position to an emergency position in which fluid under pressure is supplied from the quick action chamber to a brake pipe vent valve device for effecting the operation thereof to suddenly vent fluid under pressure from the brake pipe for propagating emergency action through a train.

The emergency piston is adapted to respond to this sudden reduction in brake pipe pressure and move the main slide valve to its emergency position for connecting an emergency reservoir to the brake cylinder for providing high emergency brake cylinder pressure, and also in this position of the main slide valve communication is opened past the end of the main slide valve from the quick action chamber to the vent valve device so that fluid under pressure from the quick action chamber is supplied to the vent valve device for maintaining same in the brake pipe venting position for a certain length of time.

In the above equipment a spring-pressed stop is provided in the emergency piston stem adapted to engage the end of the main slide valve when the piston and auxiliary slide valve are in service position. The main slide valve is designed to require a force to start it moving which exceeds that required to compress the spring of the spring-pressed stop and to move the auxiliary slide valve, so that when the stop engages the main valve, the pressure of the spring on the stop is intended to prevent undesired movement of the parts past the service position upon a service reduction in brake pipe pressure.

It is difficult to ensure that the static frictional condition of the main slide valve will remain as above described after the devices are in service due to wear of the parts or due to moisture, oil or other foreign material which may be transmitted through the brake system in a train. As a result, it is possible that the static resistance to movement of the main slide valve may become so reduced that said valve will be moved by the spring stop before sufficient differential of pressures will be obtained on the emergency piston to compress the spring acting on the stop. In other words, if the main slide valve is in such a condition, the emergency valve device may move to emergency position upon a service reduction in brake pipe pressure initiated by operation of the usual brake valve device, or due to the quick service reduction in brake pipe pressure effected by the operation of the service portion of the equipment. In either case, the movement of the emergency valve device to emergency position effects a local emergency reduction in brake pipe pressure which causes serial operation of the other emergency valve devices in the train to effect an emergency application of the brakes, which is undesirable.

The principal object of the invention is to provide an improved emergency valve device adapted to obviate the above difficulty.

According to the invention, the passage through which fluid under pressure is adapted to be supplied to the vent valve piston is at all times under the control of the auxiliary slide valve, and since fluid under pressure is not supplied to this passage except in case of movement of the auxiliary slide valve, which requires compressing of the spring in the emergency piston stem, fluid under pressure will never be supplied to the vent valve device unless the main slide valve is in such condition as to provide sufficient resistance to cause said spring to be compressed.

Other objects and advantages will be apparent from the following more detailed description of the invention.

In the accompanying drawing, Fig. 1 is a diagrammatic view, mainly in section, of a portion of a fluid pressure brake equipment embodying the invention; and Fig. 2 is a diagrammatic view of a fragment of the device shown in Fig. 1 and embodying a modification of the invention.

The portion of the fluid pressure brake equipment shown in Fig. 1 of the drawing is substantially the same as a similar portion of the brake equipment disclosed in the aforementioned pending application, but only those parts are shown which are deemed necessary to a comprehensive understanding of the invention.

The fluid pressure brake equipment shown in Fig. 1 comprises a pipe bracket 1, only a portion of which is shown, an emergency valve device 2 mounted on said pipe bracket, a brake pipe vent valve device 3 mounted on said pipe bracket, and an emergency reservoir 4, a brake cylinder 5 and brake pipe 6 connected to said pipe bracket. Pipes 7 and 8 which are connected to the pipe bracket 1 lead to an auxiliary reservoir (not shown) and to a retaining valve device (not shown), respectively.

The emergency valve device 2 comprises a casing containing an emergency piston 9 having at one side a chamber 10 connected to the brake pipe 6 through passages 11 and 12 and a branch pipe 13. The piston 9 has at the opposite side a chamber 14 which is connected to a passage 15 leading to a quick action chamber 16. Disposed in the valve chamber 14 are a main slide valve 17 and an auxiliary slide valve 18 adapted to be operated by the piston 9.

The left hand end of the valve chamber 14 is closed by a cover 19 in which there is provided a bore 20 arranged axially of the piston 9. The piston 9 has a stem 21, the end of which is slidably mounted in the bore 20. The stem 21 has a recess in which the auxiliary slide valve 18 is disposed, while the main slide valve 17 is disposed between a shoulder 22 provided on the back of piston 9 and a shoulder 23 formed on the stem 21.

A bore 24 is provided in the end of the piston stem 21, the outer end of this bore being closed by a plug 25, while the inner end of the bore extends beyond the shoulder 23 in a direction toward the piston 9. A plunger 26 is slidably mounted in this bore and has a stem 27 mounted in a suitable bore in the plug 25. A spring 28 is interposed between the plug 25 and the plunger 26 and acts to urge the plunger into engagement with the inner end wall of bore 24, in which position the right hand face of said plunger is disposed between the shoulder 23 and the adjacent end of the main slide valve 17.

The cover 19 is provided with an annular chamber 29 surrounding the portion of the cover in which the bore 20 is formed. The chamber 29 is of slightly greater diameter than that of the valve chamber 14 so as to provide a shoulder 30 on the emergency valve casing. A stop 31 is slidably mounted in chamber 29 and is urged into engagement with the shoulder 30 by means of a spring 32 disposed in said chamber. The stop 31 is provided with a central opening through which the piston stem 21 extends into the bore 20, and the piston stem is provided with an annular shoulder 33 adapted to engage said stop for defining the normal position of the main slide valve, these elements being shown in their normal position in the drawing.

The brake pipe vent valve device comprises a vent valve 35 contained in a chamber 36 and urged into engagement with a seat rib 37 by means of a spring 38 for closing communication between said chamber and a chamber 39 which is open to the atmosphere through a passage 40. The chamber 36 is in constant communication with the brake pipe 6 through passages 41, 42, 11 and 12 and branch pipe 13.

The vent valve device further comprises a movable piston 43 having a stem 44 which extends through the chamber 39 and is secured to the vent valve 35. This piston has at one side a chamber 45 connected to a passage 46 which leads to the seat of the main slide valve 17, and has at the opposite side a chamber 47 open to chamber 39.

A restricted port 48 is provided through the piston 43. A gasket 49 is provided in the casing at the right hand side of the piston 43 and is adapted to be engaged by said piston upon movement thereof in a direction toward the right hand. A leakage groove 50 is provided in the casing for connecting chamber 45 to chamber 47 when the piston 43 is in the normal position, as shown in the drawing.

A rocking pin 51 is provided for exerting seating pressure on the main slide valve 17. This pin extends through an opening in the piston stem 21 so that one end engages the slide valve 17 within a recess 52, while the other end is provided with a head 53 which engages one side of a flexible diaphragm 54 which is formed integral with a gasket 55 interposed between the emergency valve casing and a cover 56 secured to said casing. The diaphragm is subject on one side to the pressure of fluid in the valve chamber 14 and on the opposite side to the pressure of fluid in a chamber 57 and also to the pressure of a spring 34 contained in chamber 57.

The chamber 57 is at all times in communication with the emergency reservoir 4 through passages 58 and 59 and pipe 60. The emergency valve chamber 14 communicates with passage 58 through a passage 61 and past two serially arranged check valves 62 and 63, the check valve 63 being subject to the pressure of a light seating spring 64.

A passage 65 which leads to the seat of the slide valve 17 is adapted to be opened to the brake pipe 6 by way of two serially arranged check valves 66 and 67, passages 68, 41, 42, 11, 12 and branch pipe 13.

The auxiliary slide valve 18 is provided with a service port 69 adapted to register with a port 70 in the main slide valve 17 when the auxiliary slide valve 18 is moved to service position which is defined by engagement of plunger 26 with the end of the main slide valve 17, as will be hereinafter described.

The main slide valve 17 is also provided with a cavity 71 adapted to connect the emergency reservoir passage 59 to a passage 72, which is connected to the brake cylinder 5, in the emergency position of said slide valve, and adapted in a back dump position of said slide valve to connect the brake cylinder passage 72 to passage 65, as will be hereinafter described.

An emergency port 73 is provided through the main slide valve 17. This port leads to the seat of the auxiliary slide valve 18 and is adapted to be uncovered thereby and opened to the valve chamber 14 when shoulder 23 on the piston stem 21 engages the end of the main slide valve 17. The port 73 is open to a cavity 74 in the seat of the main slide valve, to which cavity passage 46 is also open.

As so far described, the emergency valve device is substantially the same as that disclosed in the aforementioned patent. According to the invention the main slide valve 17 is provided with an extension 75 which permits the cavity 74 to be lengthened in a direction towards the left hand sufficiently that said cavity and passage 46 are at all times in registry. By this construction, the passage 46 is never uncovered by the left hand end of the main slide valve 17 and thus opened directly to the valve chamber 14 as occurs in the emergency position of the emergency valve device disclosed in the aforementioned pending application.

In operation, in order to initially charge the brake equipment, fluid under pressure is supplied to brake pipe 6 in the usual well known manner. Fluid under pressure supplied to the brake pipe flows through pipe 13 and passage 12 to passage 11 and from thence in a direction towards the left hand to the emergency piston chamber 10 and in the opposite direction to the service application portion (not shown) of the brake equipment.

With the parts of the emergency valve device in the normal position shown in the drawing, fluid under pressure supplied to chamber 10 flows through a restricted port 76 to passage 15 and from thence to the emergency valve chamber 14 and quick action chamber 16, thus charging said chambers with fluid at the pressure in the brake pipe. In case the chambers 14 and 16 tend to become charged at a pressure higher than normally carried in the brake pipe, as may occur at the head end of a train, the excess pressure is adapted to unseat the check valves 62 and 63 and be dissipated by flow to passage 58 and from thence through pipe 60 to the emergency reservoir 4.

With the parts of the emergency valve device in their normal position, the auxiliary slide valve 18 laps port 73 which is connected through cavity 74 and passage 46 with the vent valve piston chamber 45. This chamber is therefore at atmospheric pressure on account of the connection through restricted port 48 and leakage groove 50 which permits spring 38 to seat the vent valve 35. The chamber 36 is therefore charged with fluid at brake pipe pressure by way of passages 11, 42 and 41.

The emergency reservoir 4 is charged with fluid at brake pipe pressure through passage 77 and pipe 60 while the brake cylinder is normally vented to the atmosphere through passage 78 by operation of the service application portion (not shown) of the brake equipment, in the same manner as described in the aforementioned pending application, which however forms no part of the invention.

If it is desired to effect a service application of the brakes, a service reduction in pressure is effected in the brake pipe 6 in the usual manner. A corresponding reduction occurs in the emergency piston chamber 10 and fluid under pressure tends to flow back from the emergency valve chamber 14 and quick action chamber 16 to the piston chamber 10 through the restricted charging port 76.

The charging port 76 is of such size, however, that a differential of pressures is promptly obtained on the emergency piston 9. If the parts of the emergency valve device are in condition to operate as intended, when a differential of say .4 of a pound is obtained on the emergency piston 9, said piston moves towards the right hand until the plunger 26 in the end of the piston stem 21 engages the end of the main slide valve 17. The main slide valve is designed to provide an effective block against further movement of the piston 9 without first compressing spring 28 which however requires an increase in the pressure differential on the piston 9. Such an increase is not intended to be obtained upon a service reduction in brake pipe pressure however, since with the plunger 26 just engaging the end of the main slide valve, the auxiliary slide valve 18 is positioned so that port 69 registers with port 70, through which ports fluid under pressure is adapted to be vented from chambers 14 and 16 to the atmosphere by way of the atmospheric passage 77 at as rapid a rate as the brake pipe pressure is reduced in effecting a service application of the brakes.

When the plunger 26 engages the end of the main slide valve, in which position the ports 69 and 70 are in registry, the port 73 is still fully lapped by the auxiliary slide valve 18.

In case the reduction in brake pipe pressure is limited to less than a full reduction, then when the pressure in chambers 14 and 16 becomes reduced to a degree slightly lower than the reduced brake pipe pressure acting in piston chamber 10, the piston 9 will be shifted toward the left hand and thereby operate the auxiliary slide valve to close communication between ports 69 and 70, while upon a further reduction in brake pipe pressure, the piston 9 will again operate to shift the slide valve 18 to service position to permit a further reduction in pressure in chambers 14 and 16, as will be evident.

If an emergency reduction in brake pipe pressure is effected, the emergency piston 9 will respond and operate upon the light differential of pressures, as hereinbefore described, to pull the auxiliary slide valve 18 to service position. The ports 69 and 70 are of insufficient size, however, to reduce the pressure in the chambers 14 and 16 at as fast a rate as the brake pipe pressure is reduced in piston chamber 10 upon an emergency reduction in brake pipe pressure, so that the differential of pressures on the piston 9 promptly increases to a degree sufficient to overcome the resistance of spring 28 and move the piston 9 and auxiliary slide valve 18 further towards the right hand to the emergency position, as defined by the engagement of shoulder 23 on the piston stem 21 with the end of the main slide valve.

The differential of pressures required to compress the spring 28 may be relatively light, such as .5 of a pound which is considered adequate to prevent undesired movement of the parts to emergency position upon a service reduction in brake pipe pressure and this differential plus that required to move the piston and auxiliary slide valve 18 are so quickly obtained upon an emergency reduction in brake pipe pressure that there is no perceptible hesitation of the parts in the service position.

In the emergency position of the auxiliary slide valve 18, port 73 is uncovered by said valve. Fluid under pressure from the chambers 14 and 16 then flows through the port 73, cavity 74, and passage 46 to the vent valve piston chamber 45. The rate at which fluid is thus supplied to chamber 45 exceeds the capacity of port 48 and leakage groove 50 to vent said chamber, so that sufficient pressure is promptly built up therein to move the piston 43 towards the right hand into sealing engagement with gasket 49 against the opposing pressures of fluid and spring 38 in chamber 36. The vent valve 35 is thus unseated which permits fluid under pressure to be suddenly vented from the brake pipe 6 through pipe 13, passages 12, 11, 42, 41, past the vent valve 35 to chamber 39 and from thence through the atmospheric passage 40.

This sudden venting of fluid under pressure from the brake pipe 6 is adapted to effect emergency operation of the brake controlling valve device on the next car in the train and so propagate emergency operation throughout a train in the usual manner.

When the pressure in chamber 10 becomes sufficiently lower than that in chamber 14 to provide a differential of pressures on piston 9 which exceeds the static resistance to movement of the main slide valve 17, said piston moves said valve outwardly to a position defined by the engagement of the piston with a gasket 79. In this position, the cavity 74 maintains communication between port 73 and passage 46 so as to continue to supply fluid under pressure to the vent valve piston 43 for holding the vent valve 35 unseated, and further, the cavity 71 connects the emergency reservoir passage 59 to the brake cylinder passage 72 so that fluid under pressure is permitted to equalize from the emergency reservoir 4 into the brake cylinder 5 to provide high emergency pressure in said brake cylinder in the same manner as described in the aforementioned pending application, it being understood that the operation of the service portion of the equipment (not shown) also supplies fluid under pressure to the brake cylinder in effecting an emergency application of the brakes.

Fluid under pressure supplied from the chambers 14 and 16 to the vent valve piston chamber 45 gradually flows to the atmosphere through the restricted port 48, chambers 47 and 39 and atmospheric passage 40. When this pressure is sufficiently reduced, the pressure of spring 38 urges the vent valve 35 back into engagement with its seat 37 so that the brake equipment may be recharged to effect a release of the brakes when it is so desired.

In order to effect a release of the brakes after an emergency application, fluid under pressure is supplied to the brake pipe 6 and from thence flows to the emergency piston chamber 10.

Adjacent the locomotive, the rate of increase in brake pipe pressure is initially rapid and the consequent increase in pressure in piston chamber 10 moves the piston 9 and slide valves 17 and 18 to their normal position as defined by engagement of shoulder 33 on the piston stem 21 with the stop 31. In this position fluid under pressure is supplied from chamber 10 through the restricted port 76 to the valve chamber 14 and chamber 16, but the capacity of port 76 is insufficient to permit these chambers to charge as rapidly as the rapid increase in brake pipe pressure. Consequently, a differential of fluid pressures is built up on piston 9 which overcomes the pressure of spring 32 on stop 31 and then moves said piston and the valves 17 and 18 to a back dump position as defined by the engagement of the back of the piston with the casing.

In this back pump position the cavity 71 connects the brake cylinder passage 72 to passage 65 which permits fluid under pressure to flow from the brake cylinder 5 to the brake pipe 6 by way of the brake cylinder passage 72, cavity 71, passage 65, past the check valves 66 and 67 and from thence through passages 68, 41, 42, 11, 12 and pipe 13.

This back pump of fluid from the brake cylinder to the brake pipe effects a sudden local increase in brake pipe pressure which effects like back dump operation of the emergency valve device on the next car. In this manner this operation is transmitted serially from car to car through a train thereby accelerating the charging of the train.

When in effecting a release of the brakes after an emergency application, the pressure in chambers 14 and 16 becomes increased sufficiently with respect to the opposing brake pipe pressure on the emergency piston 9, the pressure of spring 32 acting through stop 31 on the end of the piston stem 21 and the end of the main slide valve 17 shifts these parts back to the normal position defined by engagement of stop 31 with shoulder 30 in the casing, as shown in the drawing; after which the equipment becomes completely recharged with fluid under pressure in the same manner as described in connection with the initial charging.

As hereinbefore described, the main slide valve 19 is designed to provide sufficient resistance to movement from its normal position that it will cooperate with the plunger 26 to define the service position of the auxiliary slide valve and will cause compression of the spring 28 upon further movement of the piston 9. The spring 28 is designed to exert such a pressure on the plunger 26 as to require an increase in the differential of pressures on piston 9 to move the auxiliary slide valve 18 to the emergency position over that required to move said slide valve to the service position, this increase in differential being such as to provide an adequate margin of safety against undesired movement of the auxiliary slide valve to emergency position upon a service reduction in brake pipe pressure.

The main slide valve may be designed to have such static resistance to movement as to ensure the operation of the auxiliary slide valve just described since the pressure differential required to move this valve is not critical as is the case with the auxiliary slide valve, which must operate upon a service reduction in brake pipe pressure and also upon which the rapid serial propagation of emergency action is dependent. The operation of the vent valve device ensures sufficient differential on the emergency piston to move the main slide valve regardless of its resistance condition.

It is, however, possible that the static resistance to movement of the main slide valve 17 may become so low, due to wear, water, oil or other foreign matter to which it may be subjected, that the valve will move with a force less than that required for moving the auxiliary slide valve and compressing the spring 28. If such a change in the main slide valve should occur, it is possible upon a service reduction in brake pipe pressure that, when the plunger 26 engages the end of the main slide valve 17 the main slide valve will start moving without first compressing the spring 28 and thus continue to move until the piston engages the gasket 79.

According to the invention, however, this undesired movement of the main slide valve will not effect operation of the vent valve device 3 to initiate an emergency application of the brakes on the train, as hereinbefore described, because when the main slide valve 17 moves without first compressing spring 28, the auxiliary slide valve 18 maintains the emergency port 73 lapped, and since the main slide valve never uncovers the passage 46 and opens this passage to valve chamber 14, as in the construction disclosed in the aforementioned pending application, there will be no supply of fluid under pressure to the vent valve device for effecting operation thereof to vent the brake pipe 6.

However, in case of such undesired movement of the main slide valve 17, cavity 71 therein will connect passages 59 and 72 and thus permit flow of fluid under pressure from the emergency reservoir to the brake cylinder and produce a high pressure in the brake cylinder. While this is not desired when effecting a service application of the brakes it is not particularly objectionable so far as controlling a train is concerned since it is not likely that more than one valve in a whole train will ever operate in this manner. The important result obtained, however, is that this undesired operation will not cause operation of the vent valve device and thereby an emergency application of the brakes on the entire train.

It will be evident that in case of undesired movement of the main slide valve as above described, the service bent port 70 in the main slide valve is moved out of registry with the atmospheric passage 71, so that the pressure in the chambers 14 and 16 cannot reduce in the manner hereinbefore described in connection with effecting a service application of the brakes. However, when the pressure in the emergency reservoir is reduced sufficiently by flow to the brake cylinder, the pressure of fluid in chambers 14 and 16 will unseat the check valves 62 and 63 and thus be equalized through passages 58 and 59 with that in the emergency reservoir. A sufficient reduction in pressure will thus be obtained in chamber 14 to ensure movement of the emergency valve parts back to their normal position upon an increase in brake pipe pressure in chamber 10 over the reduced pressure of chamber 14.

The reduction in pressure in chambers 14 and 16 by the flow of fluid under pressure therefrom into the emergency reservoir, as just described, will be relatively small so that if the service reduction in brake pipe pressure is sufficiently great the movement of the emergency valve parts to the normal position will be unduly delayed although it eventually will occur. In order to obtain prompt movement of the parts back to their normal position after they have undesirably moved out to emergency position upon a service reduction in brake pipe pressure, the valve device shown in Fig. 1 may be modified in the manner shown in Fig. 2.

This modification consists in providing a passage 80, containing a restriction or choke 81, which connects passage 46 to the seat of the main slide valve 17 at such a location as to be uncovered by the main slide valve 17 and thus opened directly to the valve chamber 14 upon movement of the main slide valve out of its normal position. With this construction, if the main slide valve undesirably moves out of its normal position upon a service reduction in brake pipe pressure, fluid under pressure is permitted to flow from chambers 14 and 16 through passage 80, choke 81, and passage 46 to the vent valve piston chamber 45, and from thence through the port 48 in the piston 43 and leakage groove 50 to the atmosphere, the choke 81 being such as to so restrict the flow of fluid under pressure to chamber 45 that insufficient pressure is obtained therein against the vents through port 48 and groove 50 to move the vent valve piston 43 out of its normal position. By this construction the pressure in chambers 14 and 16 is permitted to reduce substantially the same amount as the brake pipe pressure reduces or until the pressure in chamber 14 becomes reduced sufficiently that the brake pipe pressure in chamber 10 is enabled to shift the emergency valve parts back toward their normal position until the passage 80 is lapped so as to limit the reduction in pressure in chambers 14 and 16. By this construction the emergency valve device will be returned to its normal position immediately upon an increase in brake pipe pressure in effecting a release of the brakes after an application.

This modification will not affect the emergency operation of the device when it operates as intended since it merely provides an additional path of flow of fluid under pressure from the chambers 14 and 16 to the vent valve device, as will be evident.

It will now be noted that according to the invention an improved emergency valve device is provided which, in case the main slide valve is undesirably moved out of its normal position upon a service reduction in brake pipe pressure, will prevent operation of the vent valve device and thus an emergency application of the brakes on the train.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, in combination, a brake pipe, a quick action chamber, means operated by fluid under pressure to effect an emergency application of the brakes, an emergency valve device comprising a main slide valve having a port through which fluid under pressure is supplied from said chamber to said means, said port being at all times open to said means, an auxiliary slide valve mounted on and having a movement relative to said main slide valve for controlling communication from said chamber to said port, and a piston operated upon a reduction in brake pipe pressure for operating said auxiliary slide valve.

2. In a fluid pressure brake, in combination, a brake pipe, a quick action chamber, means operated by fluid under pressure to effect an emergency application of the brakes, an emergency valve device comprising a main slide valve having a port through which fluid under pressure is supplied from said chamber to said means, said port being at all times open to said means, an auxiliary slide valve mounted on and having a movement relative to said main slide valve for establishing communication from said chamber to said port, a piston operated upon a reduction in brake pipe pressure for operating said auxiliary slide valve, and yielding resistance means for opposing said relative movement.

3. In a fluid pressure brake, in combination, a brake pipe, a quick action chamber, a brake pipe vent valve device operative by fluid under pressure supplied from said chamber for venting fluid under pressure from said brake pipe, a passage through which fluid under pressure is adapted to be supplied from said chamber for operating said vent valve device, a main slide valve having an emergency port in constant communication with said passage, an auxiliary slide valve mounted on and having a movement relative to said main valve for establishing communication from said chamber to said port, and a piston operated upon a reduction in brake pipe pressure for operating said auxiliary slide valve.

4. In a fluid pressure brake, in combination, a brake pipe, a quick action chamber, a brake pipe vent valve device operative by fluid under pressure supplied from said chamber for venting fluid under pressure from said brake pipe, a passage through which fluid under pressure is adapted to be supplied from said chamber for operating said vent valve device, a main slide valve having an emergency port in constant communication with said passage and having a service vent port in communication with an atmospheric vent passage in its normal position, an auxiliary slide valve mounted on and movable relative to said main slide valve to first establish communication from said chamber to said service vent port and upon further movement to establish communication from said chamber to said emergency vent port, a piston operated upon a reduction in brake pipe pressure for moving said auxiliary slide valve, and yielding resistance means operative to oppose movement of said auxiliary valve relative to said main valve after said service vent port is opened.

5. In a fluid pressure brake, in combination, a brake pipe, a quick action chamber, a brake pipe vent valve device operative by fluid under pressure supplied through a passage from said chamber for venting fluid under pressure from said chamber, a main slide valve having an emergency port in constant communication with said passage, an auxiliary slide valve mounted on and movable relative to said main valve to a position for supplying fluid under pressure from said chamber to said port, a piston operated upon a reduction in brake pipe pressure for moving said auxiliary valve to said position, a yielding resistance means having a force less than the normal frictional resistance of said main valve for opposing movement of said auxiliary valve to said position and operative to move said main valve with said auxiliary valve in case the frictional resistance of the main valve is less than the force of said spring, movement of said main valve opening a restricted vent communication to said chamber.

6. In a fluid pressure brake, in combination, a brake pipe, a quick action chamber, a normally charged reservoir, a brake cylinder, a brake pipe vent valve device operative by fluid under pressure supplied through a passage from said chamber for venting fluid under pressure from said chamber, a main slide valve having an emergency port in constant communication with said passage, an auxiliary slide valve mounted on and movable relative to said main valve to a position for supplying fluid under pressure from said chamber to said port, a piston operated upon a reduction in brake pipe pressure for moving said auxiliary valve to said position, a yielding resistance means having a force less than the normal frictional resistance of said main valve for opposing movement of said auxiliary valve to said position and operative to move said main valve with said auxiliary valve in case the frictional resistance of the main valve is less than the force of said spring, movement of said main valve opening communication from said reservoir to said brake cylinder through which fluid under pressure is supplied for effecting an application of the brakes, and a passage including a check valve connecting said chamber to said reservoir to permit the pressure of fluid in said chamber to reduce as the pressure in said reservoir reduces.

7. In a fluid pressure brake, in combination, a brake pipe, a quick action chamber, a brake pipe vent valve device operative by fluid under pressure supplied through a passage from said chamber for venting fluid under pressure from said chamber, a main slide valve having an emergency port in constant communication with said passage, an auxiliary slide valve mounted on and movable relative to said main valve to a position for supplying fluid under pressure from said chamber to said port, a piston operated upon a reduction in brake pipe pressure for moving said auxiliary valve to said position, a yielding resistance means having a force less than the normal frictional resistance of said main valve for opposing movement of said auxiliary valve to said position and operative to move said main valve with said auxiliary valve in case the frictional resistance of the main valve is less than the force of said spring, movement of said main valve opening a restricted vent communication from said chamber to said passage for reducing the pressure in said chamber, and means for relieving the pressure of fluid thus supplied to said passage for preventing operation of said vent valve device.

8. In a fluid pressure brake, in combination, a brake pipe, a main slide valve, an auxiliary slide valve movable relative to said main slide valve and cooperative therewith in all positions thereof to control a communication through which a sudden venting of fluid under pressure from said brake pipe is adapted to be effected, a piston operative upon a reduction in brake pipe pressure for effecting movement of said valves, and yielding resistance means having a force less than the normal frictional resistance of said main slide valve for opposing relative movement of said auxiliary slide valve to a position for opening said communication, said resistance means being operative if the frictional resistance of said main slide valve is less than the force of the resistance means to move said main slide valve with said auxiliary valve and thereby maintain said communication closed.

9. In a fluid pressure brake, in combination, a brake pipe, a main slide valve, an auxiliary slide valve movable relative to said main slide valve and cooperative therewith in all positions thereof to control a communication through which a sudden venting of fluid under pressure from said brake pipe is adapted to be effected, a piston operative upon a reduction in brake pipe pressure for effecting movement of said valves, said valves cooperating upon such relative movement to open said communication and upon movement in unison to maintain said communication closed, and a yielding resistance means for opposing movement of said piston upon a reduction in brake pipe pressure with a force less than the normal frictional resistance of said main slide valve for effecting said relative movement, and operative to move said valves in unison if the frictional resistance of the main slide valve is less than the force of said resistance means.

10. In a fluid pressure brake, in combination, a brake pipe, a main slide valve, an auxiliary slide valve movable relative to said main valve and cooperative therewith in all positions thereof to control a communication through which a sudden venting of fluid under pressure from said brake pipe is adapted to be effected, a piston operative upon a reduction in brake pipe pressure for effecting movement of said valves, said valves cooperating upon such relative movement to open said communication and upon movement in unison to maintain said communication closed, and a yielding resistance means interposed between said main valve and piston and operative to oppose movement of said piston upon a reduction in brake pipe pressure, the force of said resistance means being less than the normal frictional resistance of said main valve so as to permit said relative movement, and operative in case the frictional resistance of said main slide valve is less than normal to move said valves in unison.

11. In a fluid pressure brake, in combination, a brake pipe, a main slide valve movable to various positions and controlling in all of said positions a communication through which a sudden venting of fluid under pressure from the brake pipe is adapted to be effected, an auxiliary slide valve mounted on said main slide valve normally closing said communication and movable relative thereto for opening said communication, a piston operative upon a reduction in brake pipe pressure for moving said valves, and a spring having a resistance less than the normal frictional resistance of said main slide valve operative to oppose operation of said piston to move the auxiliary slide valve relative to the main slide valve upon a reduction in brake pipe pressure, said spring being operative in case the frictional resistance of the main slide valve is less than that of the spring to move said valves in unison upon a reduction in brake pipe pressure and thereby maintain said communication closed.

12. In a fluid pressure brake, in combination, a brake pipe, a main slide valve having a normal position and movable to another position and having a predetermined frictional resistance to movement, said slide valve in and between said positions maintaining open a communication through which a sudden reduction in brake pipe pressure is adapted to be effected, an auxiliary slide valve mounted on said main valve and having a normal position closing said communication and movable relative to said main valve to an emergency position for opening said communication so as to supply fluid under pressure thereto for effecting a sudden reduction in brake pipe pressure, a piston operative upon a reduction in brake pipe pressure for moving said slide valves, and yielding resistance means acting on said main valve and on said piston in opposition to a reduction in brake pipe pressure on said piston, said resistance means having a force less than the normal frictional resistance of said main slide valve to prevent movement of said auxiliary slide valve to emergency position upon a service reduction in brake pipe pressure and to permit such movement upon an emergency reduction in brake pipe pressure and to move said valves together upon a reduction in brake pipe pressure in case the frictional resistance of said main slide valve becomes less than the force of said resistance means.

13. In a fluid pressure brake, in combination, a brake pipe, an emergency valve device comprising a main slide valve, an auxiliary slide valve having movement relative to said main slide valve to a position for effecting a sudden reduction in brake pipe pressure, a piston operated upon a reduction in brake pipe pressure for operating said valves, a yielding resistance means whose maximum is less than the normal frictional resistance of the main valve for opposing movement of said piston and slide valve to said position, said yielding resistance means being operative if the frictional resistance of the main slide valve is less than normal to move said main slide valve in unison with said auxiliary slide valve to prevent effecting a sudden reduction in brake pipe pressure.

14. In a fluid pressure brake, in combination, a brake pipe, a main valve movable to various positions and establishing in all of said positions a communication through which fluid under pressure is adapted to be supplied for effecting a sudden venting of fluid under pressure from said brake pipe, an auxiliary valve mounted on said main valve normally closing said communication and movable relative to said valve to a position for opening said communication, a piston operative upon a reduction in brake pipe pressure for moving said valves, a yielding resistance means having a force less than the normal frictional resistance of said main valve and greater than that of said auxiliary valve for preventing movement of said piston and thereby said auxiliary valve relative to said main valve to said position upon a service reduction in brake pipe pressure and for permitting such movement to said position upon an emergency reduction in brake pipe pressure, said resistance means being operative to move said main valve with said auxiliary valve upon a reduction in brake pipe pressure and thereby maintain said communication closed if the frictional resistance of the main valve is less than the force of said resistance means.

15. In a fluid pressure brake, in combination, a brake pipe, a quick action chamber, an emergency valve device comprising a main slide valve and an auxiliary slide valve mounted on and adapted to be moved relative to said main slide valve and adapted upon such relative movement to establish a communication through which fluid under pressure is adapted to be vented from said quick action chamber to a passage at a rate sufficient to effect an emergency operation, said main slide valve upon movement being adapted to establish a communication through which fluid under pressure is adapted to be vented from said chamber to said passage at a rate insufficient to effect an emergency operation, and a piston subject to the opposing pressures of said brake pipe and chamber and adapted to operate upon a reduction in brake pipe pressure to effect said relative movement and to move said main slide valve.

16. In a fluid pressure brake, in combination, a brake pipe, a quick action chamber, an emergency valve device comprising a main slide valve and an auxiliary slide valve mounted on and adapted to be moved relative to said main slide valve and adapted upon such relative movement to establish with said main slide valve and in all positions thereof a communication through which fluid under pressure is adapted to be vented from said quick action chamber to a passage at a rate sufficient to effect an emergency operation, said main slide valve upon movement being adapted to establish a communication through which fluid under pressure is adapted to be vented from said chamber to said passage at a rate insufficient to effect an emergency operation, and a piston subject to the opposing pressures of said brake pipe and chamber and adapted to operate upon a reduction in brake pipe pressure to effect said relative movement and to move said main slide valve.

17. In a fluid pressure brake, in combination, a brake pipe, a quick action chamber, an emergency valve device comprising a main slide valve and an auxiliary slide valve mounted on and adapted to be moved relative to said main slide valve and adapted upon such relative movement to establish a communication through which a service rate of venting of fluid under pressure from said chamber is adapted to be effected, said main slide valve upon movement being adapted to establish a communication through which fluid under pressure is vented from said chamber to an emergency passage through which fluid under pressure is adapted to be supplied to effect an emergency operation, means for restricting said venting of fluid under pressure from said chamber to said emergency passage to a degree which is insufficient to effect an emergency operation, and a piston subject to the opposing pressures of said brake pipe and chamber and operative upon a service reduction in brake pipe pressure to either effect said relative movement of said auxiliary slide valve or to move said main slide valve in case its resistance to movement is such as to permit movement thereof before the auxiliary slide valve is moved.

SIDNEY G. DOWN.